US012565045B2

(12) United States Patent
Weaver

(10) Patent No.: US 12,565,045 B2
(45) Date of Patent: Mar. 3, 2026

(54) HYDROPHILIC FOAM HAVING IMPROVED FLUID RETENTION

(71) Applicant: Brady Worldwide, Inc., Milwaukee, WI (US)

(72) Inventor: Sean T. Weaver, Lexington, KY (US)

(73) Assignee: BRADY WORLDWIDE, INC., Milwaukee, WI (US)

(*) Notice: Subject to any disclaimer, the term of this patent is extended or adjusted under 35 U.S.C. 154(b) by 206 days.

(21) Appl. No.: 18/183,979

(22) Filed: Mar. 15, 2023

(65) Prior Publication Data

US 2024/0308229 A1 Sep. 19, 2024

(51) Int. Cl.
*B41J 2/175* (2006.01)

(52) U.S. Cl.
CPC ....... *B41J 2/17513* (2013.01); *B41J 2/17536* (2013.01)

(58) Field of Classification Search
CPC ..... C11D 17/0039; C11D 3/2082; C11D 3/28; C11D 3/33; C11D 3/505; B41J 2/17513; B41J 2/17533; B41J 2/17536; B41J 2/17556
See application file for complete search history.

(56) References Cited

U.S. PATENT DOCUMENTS

| | | | | |
|---|---|---|---|---|
| 4,289,171 | A | 9/1981 | Rassbach | |
| 4,929,969 | A | 5/1990 | Morris | |
| 5,297,883 | A | 3/1994 | Ozu | |
| 5,306,578 | A | 4/1994 | Ohashi et al. | |
| 5,742,309 | A | 4/1998 | Tajima et al. | |
| 5,971,646 | A | 10/1999 | Chavatte et al. | |
| 6,045,218 | A | 4/2000 | Tajima et al. | |
| 6,270,206 | B1 | 8/2001 | Shimizu et al. | |
| 6,709,092 | B2 | 3/2004 | Hayashi et al. | |
| 6,796,645 | B2 | 9/2004 | Hayashi et al. | |
| 6,874,875 | B1 | 4/2005 | Anderson et al. | |
| 6,893,181 | B1 | 5/2005 | Duez et al. | |
| 7,147,311 | B2 | 12/2006 | Stellbrink et al. | |
| 7,377,706 | B2 | 5/2008 | Silverbrook et al. | |
| 7,938,523 | B2 | 5/2011 | Aldrich | |
| 9,962,948 | B1 | 5/2018 | Bernard et al. | |
| 10,611,185 | B2 | 4/2020 | Xie | |
| 2001/0007463 | A1 | 7/2001 | Hayashi et al. | |
| 2001/0035897 | A1 | 11/2001 | Hayashi et al. | |
| 2003/0068191 | A1 | 4/2003 | Hori | |
| 2003/0075106 | A1* | 4/2003 | Lee ...................... | B41J 2/17553 118/663 |

(Continued)

FOREIGN PATENT DOCUMENTS

| | | | |
|---|---|---|---|
| CA | 2241801 | C | 2/2004 |
| EP | 2060397 | B1 | 10/2010 |

(Continued)

*Primary Examiner* — Lawrence D Ferguson
(74) *Attorney, Agent, or Firm* — Brianna Schonenberg

(57) ABSTRACT

A fluid ejection cartridge having a cartridge body with a cavity therein and an ejection head attached to an external surface of the cartridge body opposite the cavity. A cylindrical or a rectangular-prism shaped body made of a hydrophilic open-cell foam material is disposed in the cavity of the cartridge body. The cylindrical or rectangular-prism shaped body has at least one uncoated hydrophilic surface and two or more surfaces coated with a hydrophobic material.

10 Claims, 2 Drawing Sheets

(56) References Cited

U.S. PATENT DOCUMENTS

| | | | |
|---|---|---|---|
| 2005/0169691 | A1 | 8/2005 | Yamada et al. |
| 2006/0249543 | A1 | 11/2006 | Pardonge et al. |
| 2007/0000831 | A1 | 1/2007 | Kelly et al. |
| 2008/0063463 | A1 | 3/2008 | Hori |
| 2008/0156831 | A1 | 7/2008 | Nakayama et al. |
| 2008/0309740 | A1 | 12/2008 | Aldrich |
| 2009/0294094 | A1 | 12/2009 | Suzuki et al. |
| 2010/0024898 | A1 | 2/2010 | Bansal et al. |
| 2011/0274849 | A1 | 11/2011 | Van Pul et al. |
| 2014/0257208 | A1 | 9/2014 | Ueta et al. |
| 2016/0073763 | A1 | 3/2016 | Matsui |
| 2016/0145034 | A1 | 5/2016 | Laidler et al. |
| 2016/0183660 | A1 | 6/2016 | Kim et al. |
| 2017/0058243 | A1 | 3/2017 | Levner et al. |
| 2018/0072578 | A1 | 3/2018 | Kim et al. |
| 2024/0308229 | A1 | 9/2024 | Weaver |
| 2025/0018720 | A1 | 1/2025 | Omura |

FOREIGN PATENT DOCUMENTS

| | | | |
|---|---|---|---|
| GB | 2595786 | B | 6/2022 |
| JP | S62238799 | A | 10/1987 |
| JP | H04348947 | A | 12/1992 |
| JP | H0538867 | Y2 | 9/1993 |
| JP | H0811320 | A | 1/1996 |
| JP | 2595418 | Y2 | 5/1999 |
| JP | 3255659 | B2 | 2/2002 |
| JP | 2003145985 | A | 5/2003 |
| JP | 2003226091 | A | 8/2003 |
| JP | 2003251989 | A | 9/2003 |
| JP | 2004066476 | A | 3/2004 |
| JP | 3564881 | B2 | 9/2004 |
| JP | 2008162140 | A | 7/2008 |
| JP | 4321118 | B2 | 8/2009 |
| JP | 4662527 | B2 | 3/2011 |
| JP | WO2009072656 | A1 | 4/2011 |
| JP | 5998163 | B2 | 9/2016 |
| JP | 2017038787 | A | 2/2017 |
| JP | 2017140133 | A | 8/2017 |
| JP | 2021007421 | A | 1/2021 |
| JP | 7052015 | B2 | 4/2022 |
| JP | 2022152864 | A | 10/2022 |
| KR | 100562281 | B1 | 3/2006 |
| KR | 101195715 | B1 | 10/2012 |
| KR | 101542451 | B1 | 8/2015 |
| KR | 102198089 | B1 | 1/2021 |
| WO | 2007003608 | A1 | 1/2007 |
| WO | 2009/005974 | A1 | 1/2009 |
| WO | 2018157594 | A1 | 9/2018 |
| WO | 2019013753 | A1 | 1/2019 |

* cited by examiner

HYDROPHILIC FOAM HAVING IMPROVED FLUID RETENTION

TECHNICAL FIELD

The disclosure is directed to an improved foam material for fluid ejection cartridges and to a method for improving fluid retention in the foam material during shipping and storage of the fluid ejection cartridges.

BACKGROUND AND SUMMARY

Fluid ejection cartridges often contain backpressure devices such as foam materials to prevent drooling of fluid from the ejection head and to provide a source of fluid for ejection. A common foam material used in fluid cartridges is a melamine foam material which is hydrophilic. Melamine foam is a condensate of melamine and formaldehyde and has the following typical chemical structure:

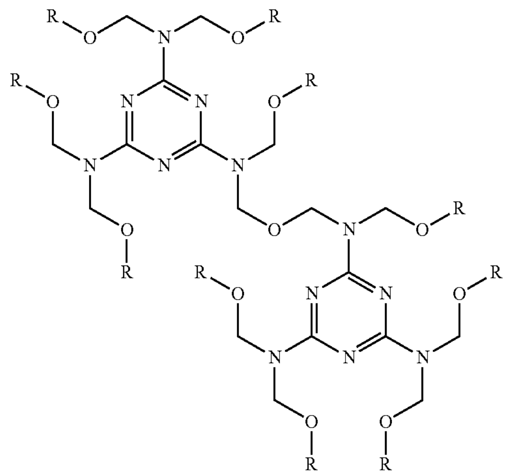

wherein R is H or an alkyl group.

The hydrophilicity of melamine foam enables high efficiencies from a fluid storage and ejection perspective. Fluid delivery efficiencies from the hydrophilic foam may range from about 90 to about 92%. Higher fluid filling capacities compared to polyurethane foams are possible due to the hydrophilic nature of the melamine foam since the melamine foam has approximately 99.8% free volume for fluid. Unfortunately, the hydrophilicity of the melamine foam also causes challenges during shipping and long-term storage. Movement of fluid out of the foam during shipping and storage of the fluid ejection cartridges is a problem particularly for higher levels of fluid in the fluid cartridges. Fluid leakage from the foam is also evident depending on the orientation of the fluid ejection cartridge during storage. Accordingly, what is needed is a hydrophilic foam material that retains a high level of fluid therein, particularly during shipping and storage of the fluid ejection cartridges containing the foam.

In view of the foregoing an embodiment of the disclosure provides a fluid ejection cartridge having a cartridge body having a cavity therein and an ejection head attached to an external surface of the cartridge body opposite the cavity. A cylindrical or a rectangular-prism shaped body made of a hydrophilic open-cell foam material is disposed in the cavity of the cartridge body. The cylindrical or rectangular-prism shaped body includes at least one uncoated hydrophilic surface and two or more surfaces coated with a hydrophobic material.

In another embodiment there is provided a method for improving fluid retention in an open-cell foam for a fluid ejection cartridge. The method includes coating two or more surfaces of a cylindrical or rectangular prism-shaped hydrophilic open-cell foam body with a hydrophobic material so that at least one surface of the cylindrical or rectangular prism-shaped hydrophilic foam body remains uncoated. The hydrophobic material is cured on the two or more surfaces to provide hydrophobic surfaces on the two or more surfaces of the cylindrical or rectangular prism-shaped hydrophilic open-cell foam body.

In another embodiment there is provided a method for improving the fluid retention in a fluid ejection cartridge containing a hydrophilic fluid. The method includes providing a cylindrical or rectangular prism-shaped open cell foam body; coating all but one surface of the cylindrical or rectangular prism-shaped open cell foam body with a hydrophobic material; curing the hydrophobic material on the coated surfaces of the cylindrical or rectangular prism-shaped open cell foam body; inserting the cylindrical or rectangular prism-shaped open cell foam body into the fluid ejection cartridge; filling the cylindrical or rectangular prism-shaped open cell foam body with a fluid; and sealing the cylindrical or rectangular prism-shaped open cell foam body in the fluid ejection cartridge.

In some embodiments, the hydrophilic open-cell foam material is a melamine foam material.

In some embodiments, the hydrophobic material is reactive with the two or more coated surfaces of the melamine foam material.

In some embodiments, the hydrophobic material cross-links and encapsulates fibers of the melamine foam material.

In some embodiments, is selected from fluorinated hydrocarbons, siloxanes, long chain hydrocarbons having at least 6 carbon atoms, and coating compounds that provide a contact angle of greater than 90 degrees.

In some embodiments, the rectangular prism-shaped hydrophilic open-cell foam body has one uncoated hydrophilic surface and five surfaces coated with the hydrophobic material.

In some embodiments, the cylindrical or rectangular prism-shaped hydrophilic open-cell foam body has only one uncoated hydrophilic surface.

In some embodiments, the two or more surfaces are coated with the hydrophobic material using a method selected from roll coating the two or more surfaces, dip-coating the two or more surfaces, spray-coating the two or more surfaces, brush coating the two or more surfaces, and stamp coating the two or more surfaces.

In some embodiments, the two or more surfaces have a hydrophobic coating thickness ranging from about 2 nm to about 500 μm.

In some embodiments, the rectangular prism-shaped hydrophilic open-cell foam body has one partially coated surface and five fully surfaces fully coated with the hydrophobic material, so that the partially coated surface is configured to provide a fluid flow rate ranging from about 0.1 to about 19 mL per minute to the ejection head.

An advantage of the embodiments disclosed herein is that the fluid cartridges containing hydrophobic coated foam materials tend to retain fluid much better and for a longer period of time than conventional fluid cartridges containing uncoated foam materials. Accordingly, the improved fluid cartridges disclosed herein may be transported and stored without noticeable fluid leakage from the cartridges and without having to be concerned with fluid cartridge orientation during shipping and storage.

DETAILED DESCRIPTION OF EMBODIMENTS

For the purposes of this disclosure, the term "melamine foam" means a hydrophilic open-cell foam made from a condensation reaction between melamine and formaldehyde having the general structure:

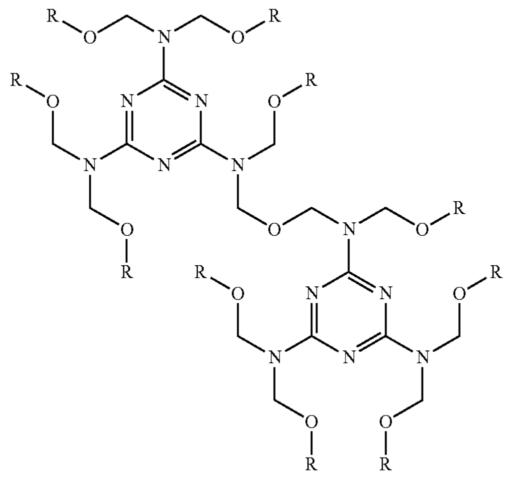

wherein R is selected from H and an alkyl group.

Figure 1:
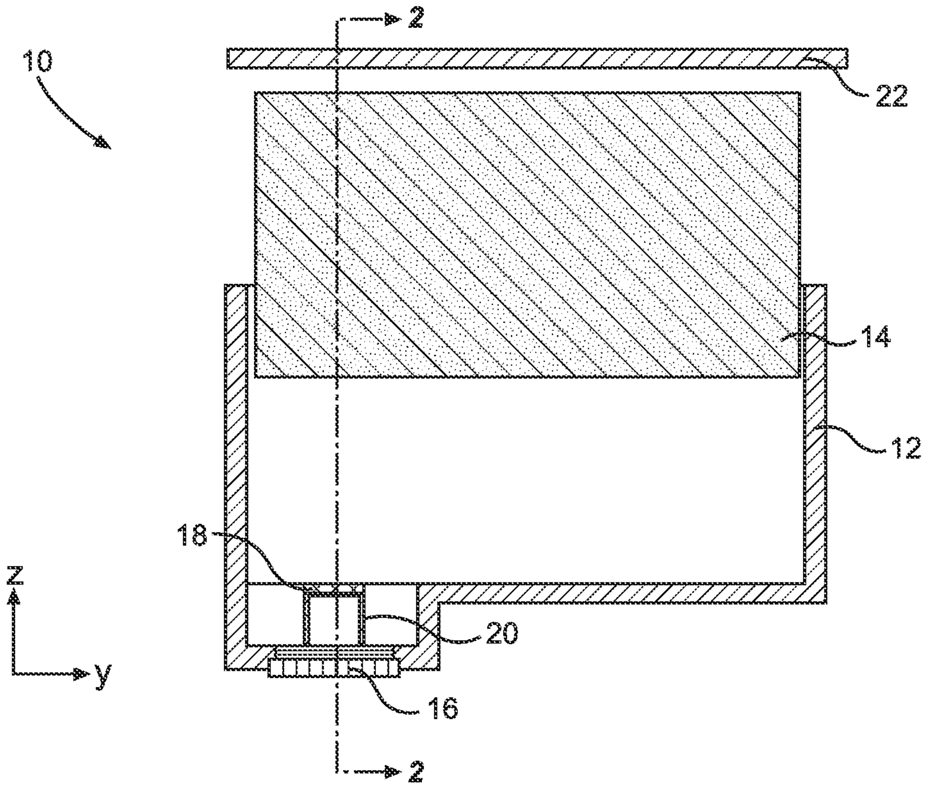
FIG. 1 is a cross-sectional view, not to scale, of a fluid cartridge containing a foam insert according to an embodiment of the disclosure.
Figure 2:
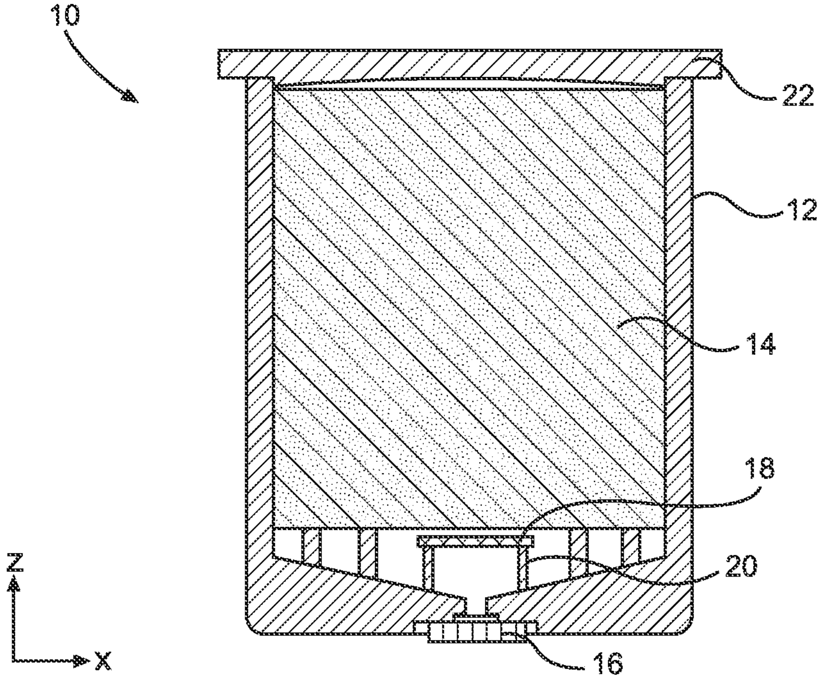
FIG. 2 is a cross-sectional view, not to scale, of the fluid cartridge of FIG. 1 through section A-A thereof.

The shape of the melamine foam is not particularly limited or critical to the disclosed embodiments and thus may have any shape that is suitable for use in a fluid cartridge. Particularly useful foam shapes may include cylindrical foam and rectangular-prism shaped foam. Cross-sectional views of typical fluid cartridges containing melamine foam inserts are illustrated in FIGS. 1 and 2. The fluid cartridge 10 includes a cartridge body 12 for holding a melamine foam material 14 that is impregnated with a fluid such as ink. The cartridge body also includes a fluid ejection head 16 that is activated to dispense fluid from the cartridge 10. The foam 14 is in fluid contact with a filter 18 disposed on a filter tower structure 20 for feeding the fluid to the ejection head 16 and the foam 14 induces a backpressure within the cartridge body 12 to prevent fluid from drooling out of the ejection head 16. A cover 22 is applied to the cartridge body 12 to retain the fluid in the cartridge 10.

The melamine foam 14 is typically filled with a fluid such as a water-based ink, a solvent based ink, or other water- or solvent-based fluid. The amount of fluid filling the void spaces or pores in the foam may range from about 50 to about 100% of the capacity of the foam to retain the fluid. As the amount of fluid approaches the 100% capacity of the foam, there is a tendency for the fluid to leak from the foam 14 and accumulate in void areas or spaces of the cartridge body 12. Since the foam 14 cannot maintain a backpressure on fluid that is not within the void spaces of the foam, i.e., the fluid that has leaked out of the foam, the fluid may leak from any opening or unsealed portion of the cartridge body 12.

One method according to an embodiment of the disclosure for reducing the amount of fluid that leaks out of the foam 14 and for improving the retention of fluid in the foam 14 is to apply a hydrophobic coating to one or more outer surface of the foam 14. For a foam containing a water-based or solvent-based fluid, the hydrophobic coating acts like a barrier to prevent the fluid in the foam 14 from moving past the coated outside surface(s) of the foam 14 as long as the surface tension of the fluid in the foam is higher than the surface energy of the hydrophobic coating. The hydrophobic coating barrier assists in retaining the fluid in the foam 14 during shipment or long-term storage of the fluid cartridge 10.

Figure 3:
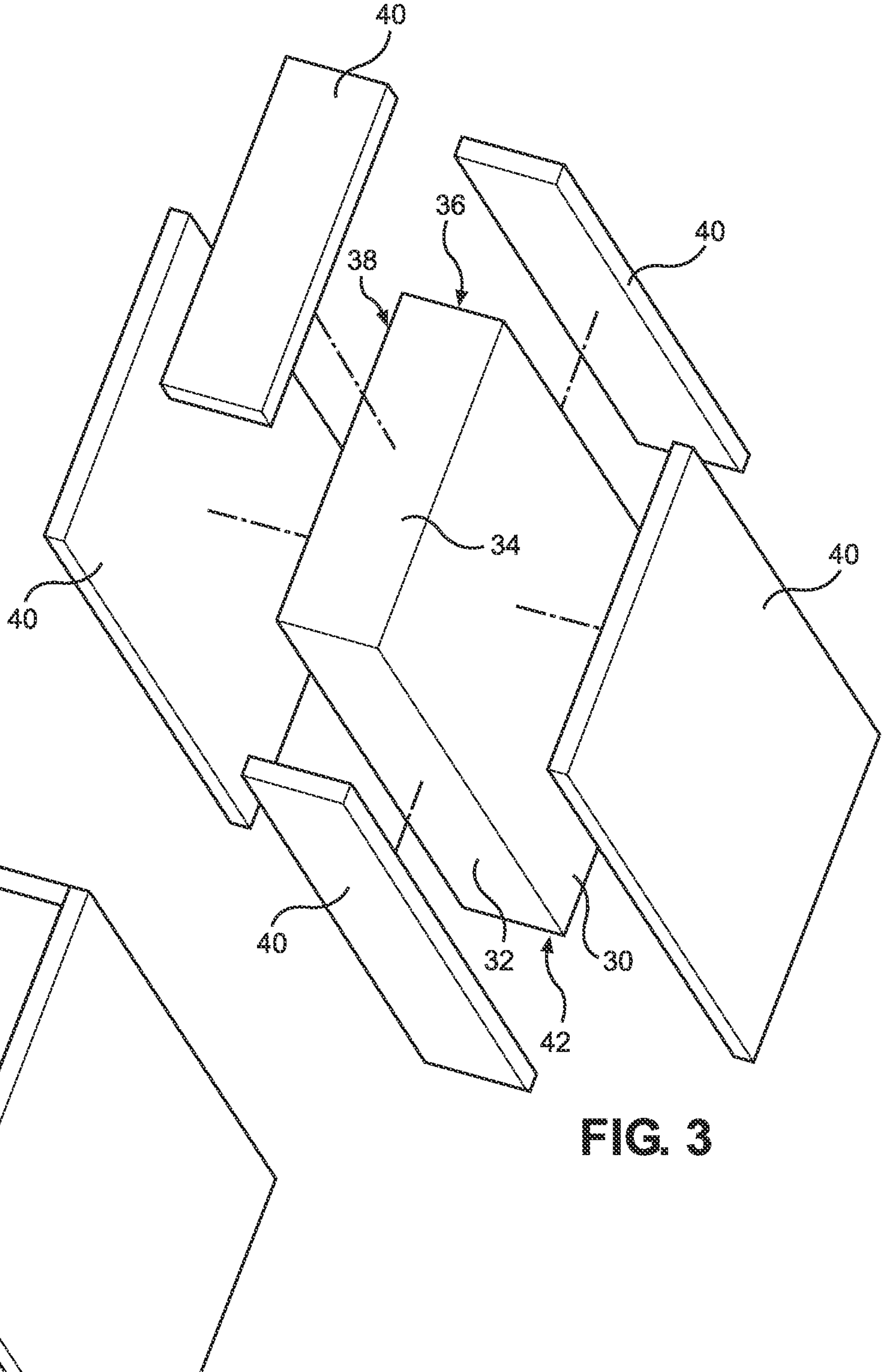
FIG. 3 is a schematic perspective, exploded view, not to scale, of a foam insert according to an embodiment of the disclosure.
Figure 4:
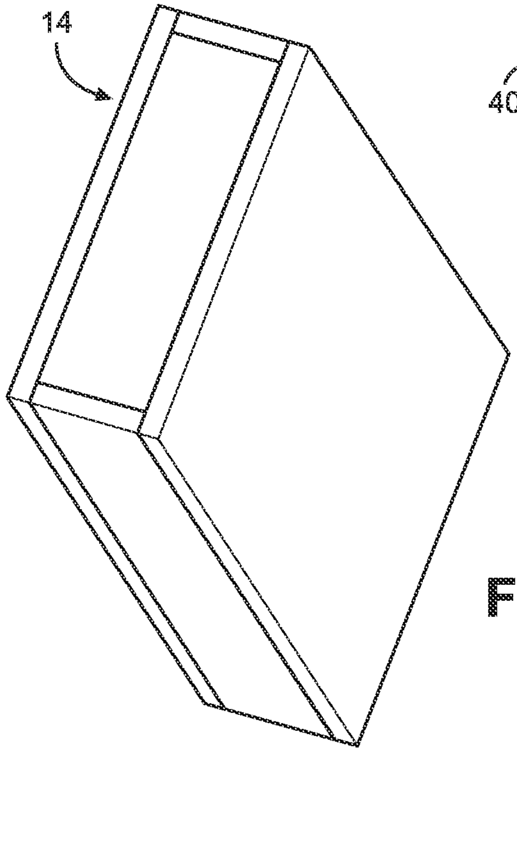
FIG. 4 is a schematic perspective view, not to scale, of the foam insert of FIG. 3 containing a hydrophobic coating.

In some embodiments, the foam 14 is a cylindrical or rectangular-prism shaped foam 14 having at least one uncoated hydrophilic surface and two or more surfaces coated with a hydrophobic material. In some embodiments the foam 14 is a rectangular prism-shaped hydrophilic open-cell foam 14 having one uncoated hydrophilic surface and five surfaces coated with the hydrophobic material. In other embodiments, the foam has a cylindrical or rectangular prism-shaped hydrophilic open-cell foam body having only one uncoated hydrophilic surface. FIGS. 3 and 4 are somewhat schematic illustrations of a foam 14 according to the disclosure having sides 30, 32, 34, 36 and 38 coated with a hydrophobic material 40 so that only one side 42 remains uncoated. The uncoated side 42 will be in contact with the filter 18 in the cartridge body so that the fluid can flow from the foam 14 into the filter tower structure 20 and out of the ejection head 16 during a fluid ejection sequence. In this way, the hydrophobic material 40 reduces or prevents fluid from leaking out of the foam 14 through sides 30, 32, 34, 36 and 38.

In some embodiments, the side 42 may be partially coated so that an uncoated area remains adjacent to the filter 18. Flow into the filter 18 from the uncoated area of side 42 of the foam 14 is provided by capillary actions through the foam 14 and filter 18 in the area of contact between the foam 14 and the material of the filter 18. If fluidic contact between the foam 14 and filter 18 is broken, the ejection head will de-prime due to lack of fluid flow. The fluid flow rate is determined by the surface energy of the foam, the foam density, the number of pores per unit area of the foam, and the free volume of the foam. Other factors that affect the fluid flow rate include the filter pore size and number of filter layer, the viscosity of the fluid, the surface tension of the fluid and the column height of fluid relative to the fluid ejection head. Based on the foregoing, the uncoated area is of the foam is selected to provide a fluid flow rate ranging from 0.1 to about 19 mL per minute to the fluid ejection head 16. Otherwise, the fluid ejection head 16 may de-prime and thus fail to eject fluid.

A wide variety of hydrophobic materials may be used to coat the sides 30, 32, 34, 36, and 38 of the foam 14, including, but not limited to: fluorinated hydrocarbons, siloxanes, hydrocarbon compounds having 6 to 20 carbon atoms, and other compounds that when coated onto the sides of the foam 14 provide a water contact angle of greater then 90 degrees.

Ideally the selected hydrophobic compound to be used is soluble in a low boiling point organic solvent. The low boiling point solvent may be flashed off during a drying process leaving an amount of hydrophobic coating on the surfaces 30, 32, 34, 36, and 38 of the foam 14. In some embodiments, a hydrophobic material that can either react on the surface of the melamine foam and or cross link and encapsulated fibers of the melamine foam may be used. A hydrophobic material that reacts with or cross links with the melamine foam material is preferable since it would eliminate the possibility of the hydrophobic material being mixed with the hydrophilic fluid. In some embodiments, the hydrophobic material provides a coating on the melamine foam having a thickness ranging from about 2 nm using gas deposition of the coating to about 500 μm using a dip coating method.

Various methods may be used to coat the surfaces of a melamine foam with a hydrophobic coating material. The methods may include, but are not limited to, dipping the surfaces of foam in the hydrophobic material, spray coating the foam with the hydrophobic material, roll coating the hydrophobic material onto the surface of the foam, brushing the hydrophobic material onto surfaces of the foam, gas deposition of the hydrophobic coating, and stamping the surfaces of the foam with the a stamp pad impregnated with the hydrophobic material. The coated hydrophobic material may then be dried for five to 20 minutes at a temperature ranging from about 100 to about 120 degrees C. depending on the solvent used for the hydrophobic material.

The following non-limiting examples are provided for the purposes of illustrating aspects of the disclosure.

EXAMPLE 1

In this example, one surface of a melamine foam was coated with 6 to 9 μm of a commercial hydrophobic solution containing 75 to 95 wt. % 3-ethoxy-1,1,1,2,3,4,4,5,5,6,6,6-dodecafluoro-2-trifluoromethyl-hexane and a from 5 to 25 wt. % of a proprietary metal complex blend sold under the tradename ACULON NANOPROOF 5.0. The coating was applied by dip-coating the surface into a container holding the hydrophobic coating material. After dip coating the foam, the foam was baked for 10 minutes at 110° C. The water contact angle of the coated side of the foam was about 118° and the oil contact angle of the coating was about 75°. The foam was then filled with ~50 mL of water and placed in two different orientations in contact with a paper towel. In the first orientation, an uncoated surface of the foam was placed in contact with the paper tower which resulted in wicking of water onto the paper tower. In the second orientation, the coated surface of the foam was placed in contact with the paper tower. No wicking of water onto the paper tower was observed when the coated surface was in contact with the paper towel.

EXAMPLE 2

In this example, five of six surfaces of a melamine foam were coated with 2 to 4 nm of a hydrophobic coating solution containing 50 to 52 wt. % ethanol and 42 to 46 wt. % of a mixture of 2-(difluoromethoxymethyl)-1,1,1,2,3,3,3-heptafluoropropane and 4-methoxy-1,1,1,2,2,3,3,4,4-nonafluorobutan) sold under the tradename ACULON AL-B. The coated foam was dried for 10 minutes at 110° C. The water contact angle of the coated side of the foam was about 116° and the oil contact angle of the coating was about 80°. The foam was then filled with ~50 mL of water. The uncoated surface was placed in contact with a filter. No wicking of water was evident on any of the five coated surfaces of the foam.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A fluid ejection cartridge comprising:

a cartridge body having a cavity therein and an ejection head attached to an external surface of the cartridge body opposite the cavity, and a cylindrical or a rectangular-prism shaped body comprised of a hydrophilic open-cell foam material disposed in the cavity of the cartridge body, wherein the cylindrical or rectangular-prism shaped body further comprises at least one uncoated hydrophilic surface and two or more surfaces fully coated with a hydrophobic material, wherein the hydrophilic open-cell foam material comprises a melamine foam material.

2. The fluid ejection cartridge of claim 1, wherein the hydrophobic material is reactive with the two or more coated surfaces of the melamine foam material.

3. The fluid ejection cartridge of claim 2, wherein the hydrophobic material cross-links and encapsulates fibers of the melamine foam material.

4. A fluid ejection cartridge comprising:

a cartridge body having a cavity therein and an ejection head attached to an external surface of the cartridge body opposite the cavity, and a cylindrical or a rectangular-prism shaped body comprised of a hydrophilic open-cell foam material disposed in the cavity of the cartridge body, wherein the cylindrical or rectangular-prism shaped body further comprises at least one uncoated hydrophilic surface and two or more surfaces fully coated with a hydrophobic material, wherein the hydrophobic material is selected from the group consisting of fluorinated hydrocarbons, siloxanes, hydrocarbon compounds having from 6 to 20 carbon atoms, and coating compounds that provide a contact angle of greater than 90 degrees.

5. The fluid ejection cartridge of claim 1, wherein a rectangular prism-shaped hydrophilic open-cell foam body has one uncoated hydrophilic surface and five surfaces fully coated with the hydrophobic material.

6. The fluid ejection cartridge of claim 1, wherein the cylindrical or rectangular prism-shaped hydrophilic open-cell foam body has only one uncoated hydrophilic surface.

7. The fluid ejection cartridge of claim 1, wherein the two or more surfaces have a hydrophobic coating thickness ranging from about 2 nm to about 500 μm.

8. The fluid ejection cartridge of claim 4, wherein a rectangular prism-shaped hydrophilic open-cell foam body has one uncoated hydrophilic surface and five surfaces fully coated with the hydrophobic material.

9. The fluid ejection cartridge of claim 4, wherein the cylindrical or rectangular prism-shaped hydrophilic open-cell foam body has only one uncoated hydrophilic surface.

10. The fluid ejection cartridge of claim 4, wherein the two or more surfaces have a hydrophobic coating thickness ranging from about 2 nm to about 500 μm.

* * * * *